US005450103A

United States Patent [19]

Kubelik

[11] Patent Number: 5,450,103

[45] Date of Patent: Sep. 12, 1995

[54] CHARGE IMAGING SYSTEM WITH BACK ELECTRODE DOT ENHANCEMENT

[75] Inventor: Igor Kubelik, Mississauga, Canada

[73] Assignee: Delphax Systems, Canton, Mass.

[21] Appl. No.: 81,645

[22] Filed: Jun. 24, 1993

[51] Int. Cl.[6] .............................................. G01D 15/06

[52] U.S. Cl. .................................. 347/123; 346/135.1; 347/127; 347/139

[58] Field of Search ...................... 346/159, 153.1, 155, 346/135.1

[56] References Cited

U.S. PATENT DOCUMENTS

| | | | |
|---|---|---|---|
| 3,358,289 | 12/1967 | Po Lee | 346/159 |
| 3,979,759 | 4/1975 | Simm | 346/159 |
| 4,593,994 | 6/1986 | Tamura et al. | 346/159 X |
| 4,799,070 | 3/1987 | Nishikawa | 346/159 |
| 5,148,204 | 2/1991 | Rezanka | 346/155 X |
| 5,157,423 | 5/1991 | Zur | 346/159 |

*Primary Examiner*—Benjamin R. Fuller
*Assistant Examiner*—Randy W. Gibson

[57] ABSTRACT

An electrographic printing system moves a dielectric imaging member past a charge transfer print cartridge or bulk charging source, and a landing electrode arrangement directs charged particles with enhanced precision to dot positions on the imaging member. The arrangement includes a central, point-like, target electrode and a field electrode that, together with the target electrode, provides a corrective electric field component to form a focusing, or at least a non-diverging field over the target position. Field deflection artifacts such as "venetian blinding" are substantially corrected. The target electrodes are located behind the imaging member, in registry with the charging cartridge which is opposed to the other side of the member. Different landing electrode arrangements may include one- or two-dimensional arrays of targeting electrodes and are adapted to either bulk or pointwise arrays of charge emitter. Two dimensional imaging may be performed by timed actuation of landing electrodes using a charged particle source that is always ON, by multiplexing the print cartridge electrodes, or multiplexing some electrodes of each of the two structures at a lower rate. A self-limiting feedback loop assures charge dot saturation without image distortion.

16 Claims, 9 Drawing Sheets

CHARGE IMAGING SYSTEM WITH BACK ELECTRODE DOT ENHANCEMENT

The present invention relates to electrographic printing devices, and more particularly to such devices wherein an electrostatic latent image is deposited by an electrically-actuated cartridge that emits charged particles to form a latent image on a receiving member, such as a dielectric drum or belt. The latent image is then typically developed, e.g., with a powder or a pigmented liquid suspension, and the developed image generally transferred to a separate receiving sheet as a final print.

Among the early constructions of this type were devices using an electrostatic pin array or a set of spark needles to charge the receiving member. More recently very dense sets of electrodes that generate particles in an array of controlled glow discharge sites have come into wide use. These arrays, originally called ionographic print cartridges, are shown, for example, in U.S. Pat. Nos. 4,155,093 to Fotland and Carrish, and 4,160,257 to Catfish, as well as in a great number of subsequent patents.

These charging cartridges, which presently may be called simply charge transfer cartridges, have first and second electrodes crossing at a site to create localized glow discharge in a small cavity or surface region, and generally have one or more further electrodes interposed between the cavity and the imaging member to selectively allow charged particles to be accelerated toward the imaging member. Other constructions may involve further electrodes to affect the divergence or focus of the beam of particles thus extracted. A different but related class of printing devices contains a larger ion generation chamber, and uses a plurality of electrically actuated gating apertures or passages to direct point-like streams of ions at an imaging member.

In a typical construction of a charge transfer cartridge, the cartridge is located adjacent a metallic drum that carries a dielectric belt or surface coating, and is oriented parallel to the drum axis, at a spacing of 0.1–0.5 millimeters from the surface. When a belt is used rather than an imaging drum, the belt typically passes over a drum or over a flat plate, which places the belt in a precise physical location opposed to the cartridge, and which may also define a conductive backplane held at a potential to establish the accelerating field for moving charge carriers from the cartridge to the imaging member.

Localized corona discharge as practised in these cartridges provides a very high-current mechanism for generation of charged particles, and, by using obliquely oriented matrices of crossing electrodes, these cartridges can achieve dense dot spacing with image resolution well above 300 DPI. Furthermore, a number of constructions offer the potential for individually controlling the quantum of charge delivered at each dot locus. However, there is a trade-off between the amount of charge delivered at each dot locus and the size or locational accuracy of the charge dot formed on the latent imaging member. This is because, as the amount of delivered charge increases, the surface potential of the member rises, up to several hundred volts, and this surface charge creates an electric field at the imaging surface that may repel or deflect the incoming beam of charged particles. Local charging of the surface also reduces the overall potential difference across the acceleration gap, leading to a broader beam shape. As more charged particles arrive, they are deflected radially outward from the nominal dot center, resulting in charge spreading, or "blooming". Because of this blooming effect it has not been possible to deposit charge dots that are simultaneously very small and very dense. Charge blooming therefore poses a serious obstacle to achieving very high resolution printing, or to achieving multicolor printing when small dots must be closely spaced or very accurately positioned.

SUMMARY OF THE INVENTION

Accordingly, it is an object of the invention to suppress charge blooming on an imaging member.

It is another object of the invention to provide a highly resolved charge imaging apparatus.

These and other objects of the invention are attained in an electrographic printer or print cartridge apparatus wherein a source of charged particles is opposed to a receiving member, and a targeting electrode structure at the receiving member directs the charged particles to a precise target site. In one embodiment, a central targeting electrode is located behind the receiving member, and one or more separate field shaping electrodes co-act with the central electrode to direct incoming particles radially inward at the portion of the member over the targeting electrode. In different embodiments, the field shaping electrodes may include concentric rings located in front of the member, rings located behind the member and surrounding the targeting electrodes, or a single perforated sheet with the targeting electrodes each centrally extending through a perforation of the sheet. To overcome asymmetric blooming effects such as occur at line ends, split field electrodes may be used with different potentials applied to each split segment.

The source of charged particles may be a conventionally multiplexed matrix electrode array, such as shown in the above-mentioned patents, or a gated ion flow cartridge, in which case the source is placed in registry with the blooming suppressor to direct beams of particles at the sites of the targeting electrodes. Alternatively, the source may comprise a bulk generator of charged particles, such as a corona rod. In this case, the bulk generator may operate continuously while the targeting electrodes are intermittently energized to both extract charged particles and direct them to defined dot positions to form an image. Other charge sources such as the electron field emission source shown in applicant's U.S. Pat. No. 5,166,709 may also be combined with the control electrode structures of the present invention.

In a further embodiment applicable to a number of these constructions, the targeting electrode is connected in a feedback loop that controls the print cartridge to quench charged particle emissions when the received charge reaches a predetermined level.

BRIEF DESCRIPTION OF THE DRAWINGS

These and other features of the invention will be understood from the following description taken together with the drawings, wherein.

DETAILED DESCRIPTION

Figure 1:
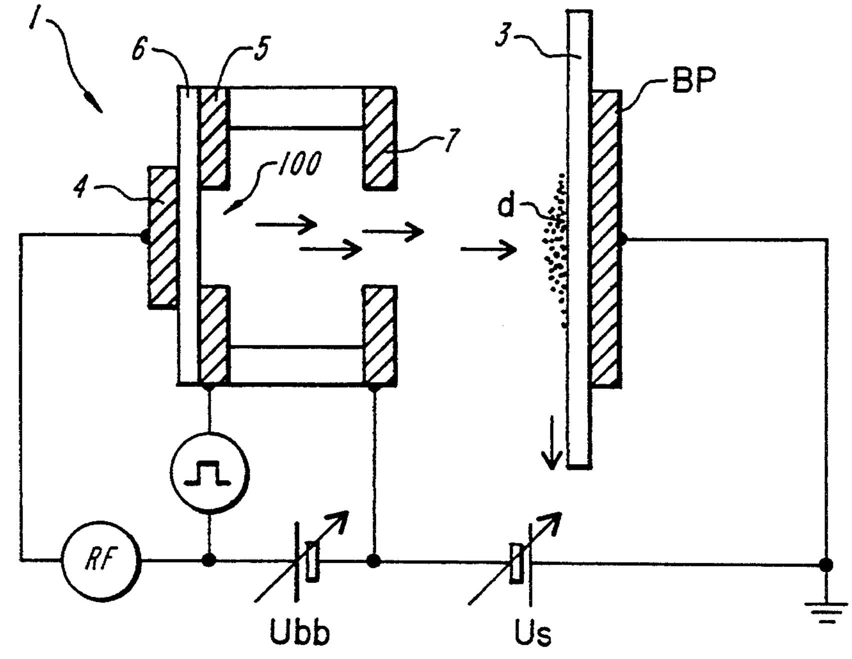
FIG. 1 (PRIOR ART)
FIG. 1 is a schematic sectional view through one charge site of a prior art charge transfer cartridge and latent imaging member.

The invention is best understood by consideration of a section through a prior art electrographic print cartridge 1 and imaging belt 3 as shown in FIG. 1. As noted above, the cartridge 1 is preferably an array of many electrodes, generally first and second sets crossing at a matrix array of points, such as shown in the aforesaid U.S. Pat. No. 4,160,257, of which only one charge generating locus is shown in FIG. 1 for illustrative purposes. Two electrodes 4 and 5 are separated by dielectric spacer layer 6, and cross each other at an angle to define a highly localized region 100 where glow discharge occurs when an RF signal of suitable voltage is applied between the electrodes 4 and 5. A back bias potential $U_{bb}$ is maintained between electrode 5 (the "finger electrode") and a front electrode 7 (the "screen electrode") and is changed by several hundred volts to control the emission of charged particles which are generated within the cavity. An accelerating potential $U_s$ is maintained between the screen electrode 7 and a conductive backing plate or a backplane BP of the dielectric receiving member 3 to provide a particle-accelerating electric field for particles of a selected polarity in the air gap between these two structures.

As FIG. 1 schematically shows, in this type of print cartridge electric discharge occurs between edges of the finger electrodes and a dielectric layer 6, such that charged particles extracted from the discharge region are deposited as a charge dot d on the dielectric imaging member 3. As will be readily understood, dot d does not physically protrude from the surface, but the graphic depiction in this manner serves to indicate the approximate lateral extent and magnitude of the deposited charge.

Figure 2A:
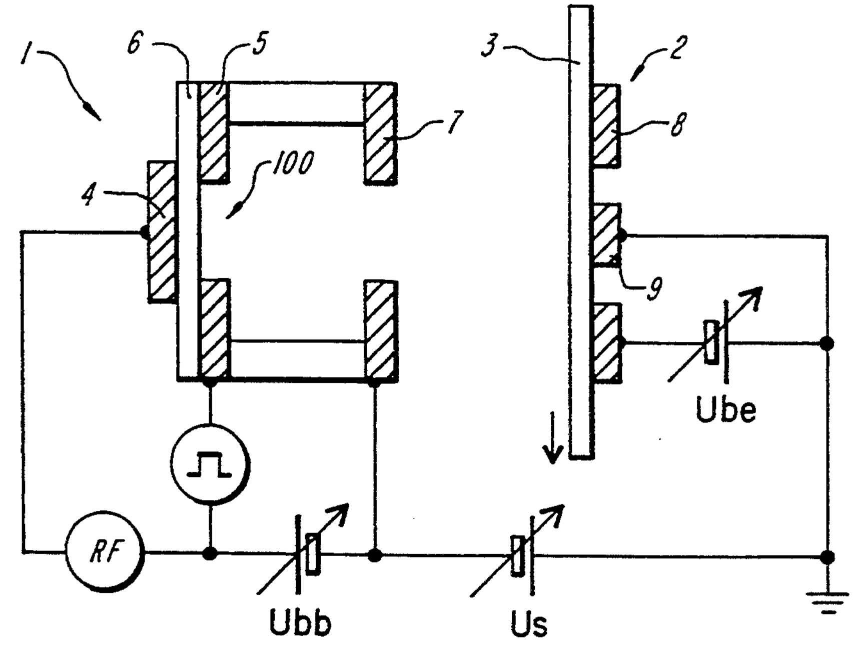
FIG. 2A is a corresponding schematic sectional view through an imaging system of the present invention.

FIG. 2A is a corresponding sectional view through one charge deposition electrode set according to an embodiment of the present invention. Corresponding elements are numbered identically to those of FIG. 1, and, in particular, the print cartridge may be identical thereto. As shown, this embodiment differs from the prior art system of FIG. 1 in having an electrode arrangement 2 for suppressing the bloom, or spreading, of the deposited charge dot d. The effect of the electrode arrangement 2 is to shape the electric field near to the surface 3 so that the deposited charge dot is directed to a point-like region and does not spread.

This blooming suppressor electrode arrangement 2 includes for each dot locus a peripheral electrode 8, which may, for example, consist of an annular electrode or a single continuous sheet with an aperture, and a central electrode 9, each central electrode preferably being aligned in this embodiment in registry with a charge emission site of the print cartridge, and extending into the aperture of the peripheral electrode 8 associated with it. The central electrode 9 is referred to as a landing or target electrode, for reasons which will become clear from the discussion below, and for simplicity will also be called an A-type electrode. The cooperating peripheral electrode 8 will be called a B-type electrode.

The pair of electrodes at each dot locus creates a field between electrode 9 and the surrounding electrode 8 having a large centrally-directed component. By application of a DC voltage between the concentric electrodes 8, 9, an electric field at the surface of the dielectric member 3 is made to have a radial component directed inwardly at electrode 9. The DC voltage is set to a level that will substantially compensate for, or significantly restrict, charge spreading or blooming caused by the amount of charge which is to be locally-deposited on the dielectric imaging member 3 above electrode 9 to form the latent image.

In fabricating a blooming suppressor to define many high resolution dots, the actual physical structure preferably further includes a dielectric spacer layer that holds the two sets of electrodes 8, 9 spaced apart in stable alignment.

Figure 2B:
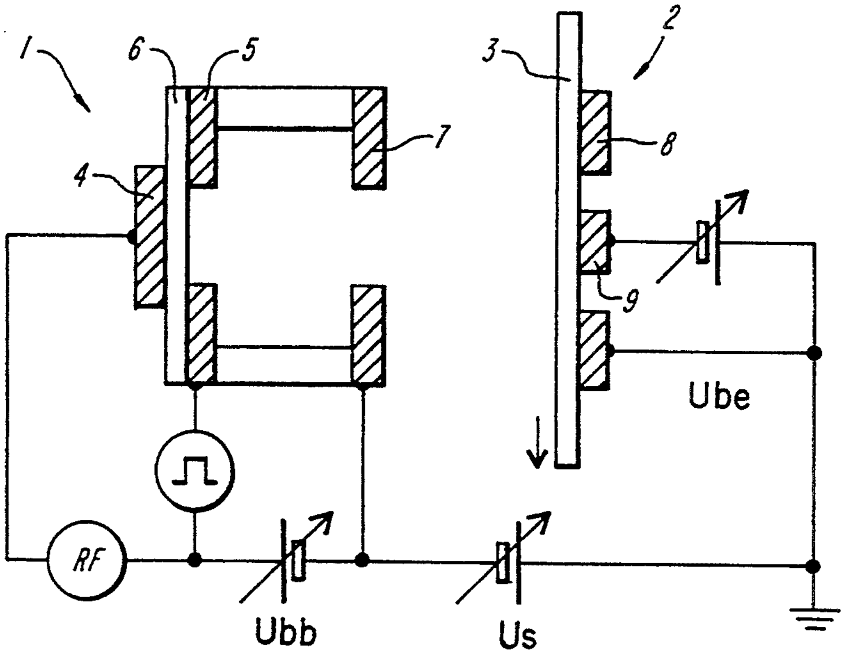
FIG. 2B is a corresponding schematic sectional view through a second embodiment of the present invention.

FIG. 2B shows another arrangement of electrode biasing for a blooming suppressor to achieve this effect. In FIG. 2A electrode 9 is grounded while a variable "back electrode potential difference" $U_{be}$ is set on the surrounding electrode 8. In FIG. 2B, this situation is reversed, with electrode 8 being grounded, while the central electrode is impressed with the difference potential $U_{be}$. In each case, the potential difference $U_{be}$ between the target and field electrodes is selected to provide a radially directed field gradient of a magnitude to counteract the normal blooming effect, as explained more fully below, while the overall acceleration potential level between the screen electrode of the print cartridge, and the central electrode 8 is selected in accordance with conventional practice to accelerate charge carriers across the gap to the dielectric member 3.

Figure 8B:
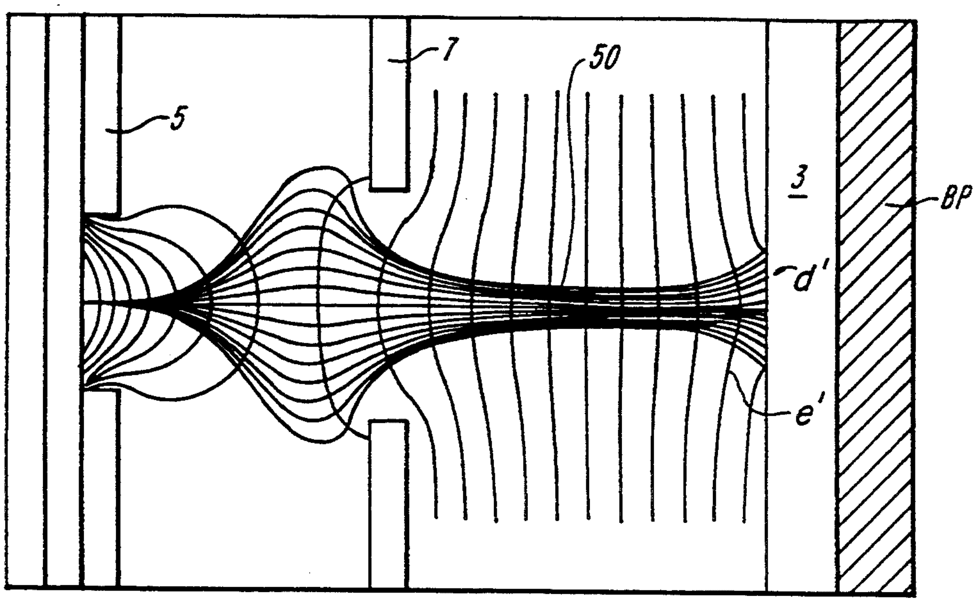
FIG. 8B (PRIOR ART)
FIGS. 8A and 8B illustrate the charging beam shape in a prior art construction.
Figure 8A:
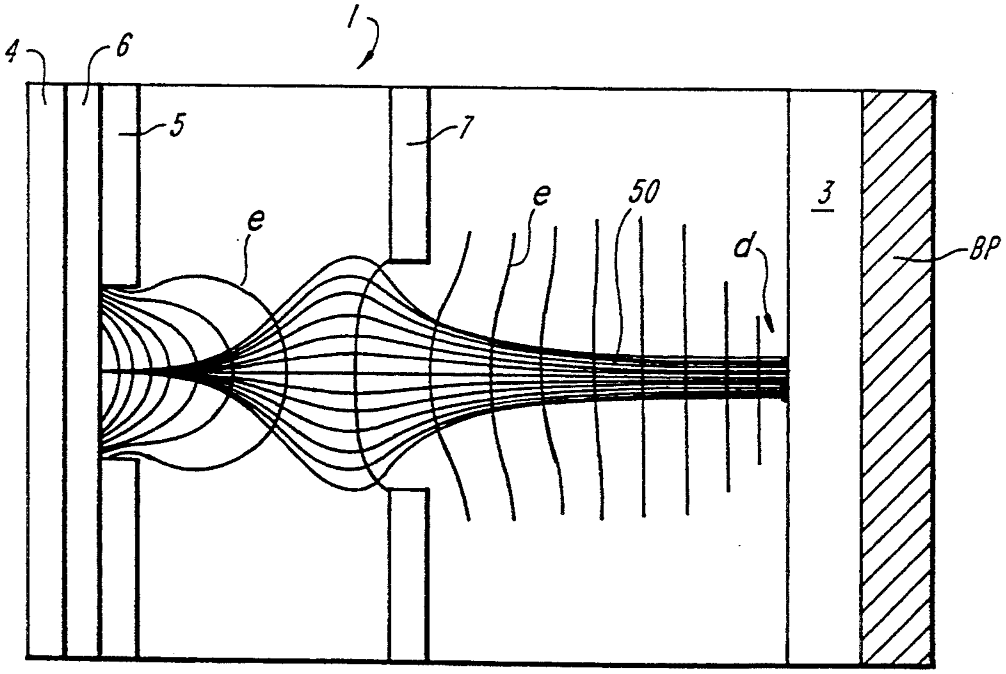
FIG. 8A (PRIOR ART)

To better illustrate the electrostatic environment, FIG. 8A shows the overall shape of the beam 50 of charged particles generated by a conventional charge transfer print cartridge 1 as described above, during initial stages of charge deposition. Electric field equipotential lines e are shown for a better understanding of the factors governing beam shape and the size of the deposited charge dot d. As shown, the extremely high breakdown voltage in the gap of finger electrode 5 creates a strongly divergent field so that beam fills out within the discharge cavity, after which a converging, or focusing effect occurs as the beam passes through the aperture of screen electrode 7, so that the final beam 50 has a diameter somewhat smaller than the screen aperture. The gap between screen electrode 7 and the imaging member 3 is small, generally about 0.2 millimeters, and beam divergence due to space charge is neglected. The print cartridge is activated over a period between several microseconds to several tens of microseconds, during which time the level of charge deposited at dot locus d builds up to a magnitude, which depending on printer design, may be as high as several hundred volts.

FIG. 8B illustrates the effect of continuing charge deposition on the evolution of beam shape. As the level of deposited charge increases, the equipotential lines e' located near the highly charged dot d' curve down, forming a dip or concavity in the acceleration field equipotential lines that is a radially divergent field. This local field spreads the beam 50, so that incoming charge carriers are deflected radially away from the dot center and the diameter of the deposited dot may increase two-fold or more.

In accordance with the present invention, the electric field distribution at the surface of the charge-receiving member 3, which is referred to below simply as the "surface field", is controlled to correct this beam distortion.

Thus, the charge dispersion or charge density dilution witnessed as "blooming" is due in large part to the variations in potential gradient between the potential $U_S$ at screen 7 of the charging device, and the surface potential of the imaging member. In general, it is desirable to maintain an acceleration field strength of approximately 1000–2500 volts/millimeter in the air gap above the imaging member 3. By setting potentials $U_A$, $U_B$ on the A- and B- electrodes such that $$|U_S-U_B|<|U_S-U_A|$$

a beam-converging field is established at the target point overlying the A electrode.

Figure 8C:
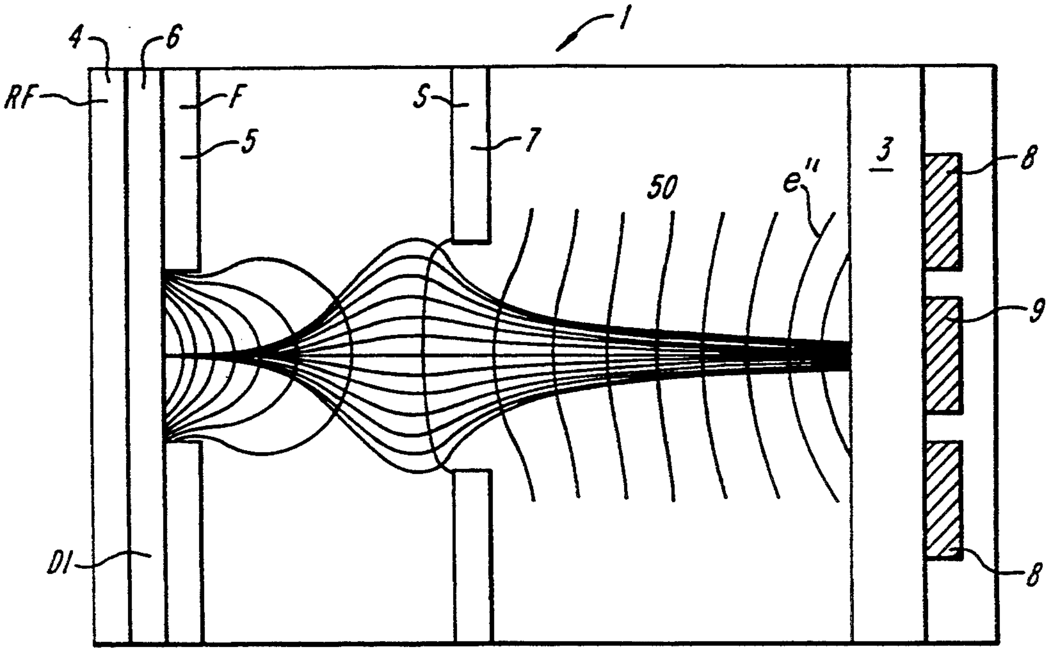
FIG. 8C shows beam shape with the present invention.

FIG. 8C illustrates such control in accordance with one embodiment of the present invention. Electrodes 8 and 9 are impressed with potentials to create a radial electric field centered above the targeting electrode 9, so that the equipotential lines e'' at the surface are convexly curved, and focus the beam inwardly to produce a charge dot d of small diameter. A symmetrical field is illustrated, and is obtained either by using a single peripheral electrode 8 which entirely surrounds the center electrode 9, or by using upper and lower split electrode halves both energized at the same potential.

Figure 9A:
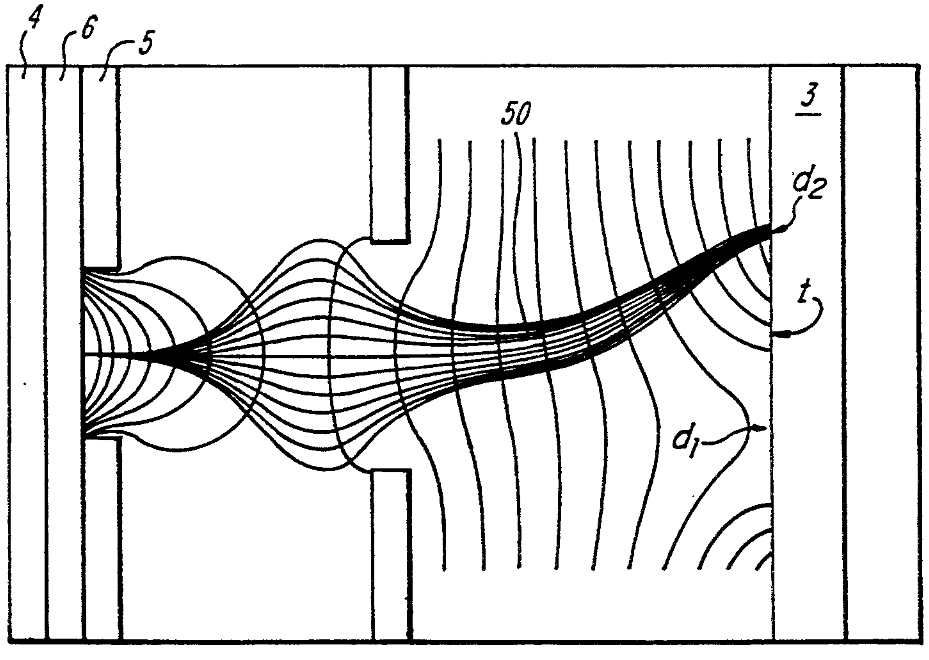
FIG. 9A (PRIOR ART)
FIGS. 9A and 9B illustrate beam shape in a prior art construction, and in a further asymmetric embodiment of the present invention, respectively.

In addition to correcting for beam divergence, the present invention corrects beam deflection, such as may occur when a particular image pattern calls for laying down a charge dot adjacent to a region that has previously been charged to a high level, or calls for laying down a dot between a region of high charge and a closely spaced one of low charge. FIG. 9A illustrates such a situation, wherein a dot or region $d_1$ of high charge density creates field lines over the intended landing site or target region t for an adjacent charge dot. In this situation the beam 50 is bent over or deflected laterally away from $d_1$ to a site $d_2$, where it is focused to a small off-center dot by the fringing field. This effect commonly occurs using conventional print cartridges in which the RF drive lines are sequentially actuated. When the later actuated RF drive lines 4 are fired to deposit a dot next to already charged regions, each dot is successively displaced, with an especially pronounced irregularity at the end of each strip-like finger electrode near an existing charge accumulation, creating an effect known as "Venetian blinding".

Figure 9B:
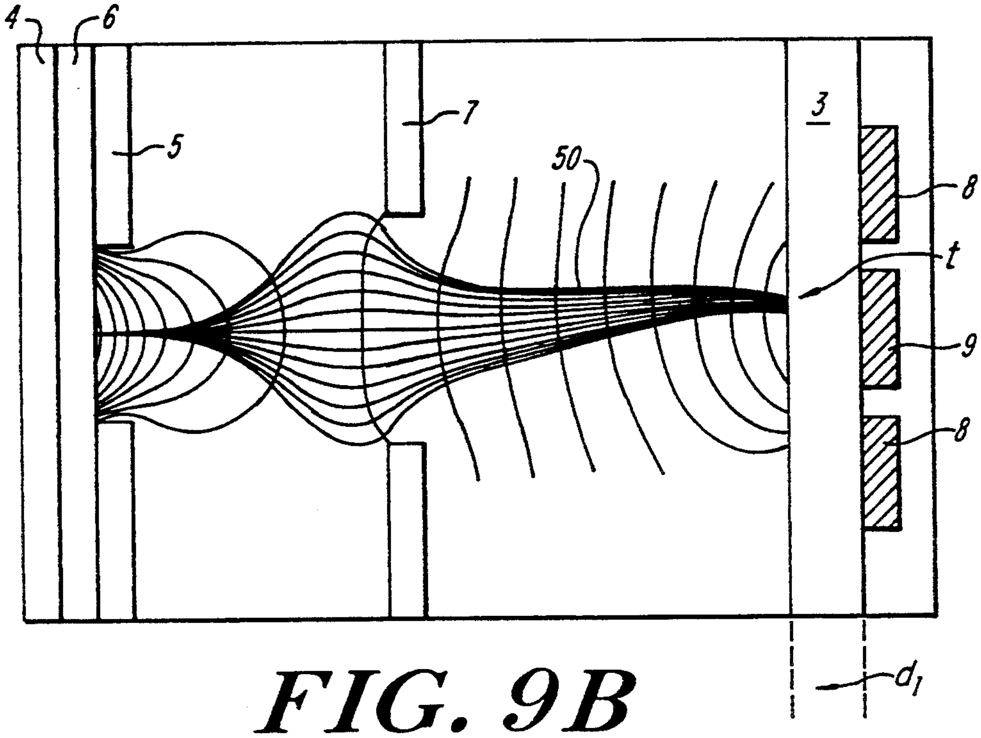

FIG. 9B illustrates the field lines for correction of such a deflected trajectory, using an embodiment of the present invention. In this embodiment, the peripheral electrode structure 8 is illustrated as including an annular electrode surrounding the central electrode 9. Electrode 8 is set to an elevated potential difference with regard to the screen electrode, to restore field flatness over the region above the electrode 8, and electrode 9 is set to an even greater potential difference so that the radial field generated at the surface of dielectric member 3 overlying electrodes 8, 9 centrally focuses the incoming beam despite the nearby charge accumulation, and such that its radial component also counteracts the blooming effect of deposited charge. It thus corrects the surface field to provide a more or less symmetric focusing field extending to the other side of center electrode 9 where no charge had previously accumulated. With this arrangement, the beam 50 is not deflected, but is brought to a sharp focus at the intended target site t. By way of example, the annular gap between electrodes 8, 9 is on the order of 0.05 mm, and the potential difference is several hundred volts or more.

The invention also contemplates field electrodes 8 which are split side-to-side into two semicircular electrodes 8*a*, 8*b* which may receive different drive voltages to correct a Venetian-blind type field. In general, the invention contemplates not only pairs of side-to-side split electrodes 8*a*, 8*b*, but electrodes 8 separated to form different top and bottom fields, or concentric electrodes 8*i* of three or more segments that are intermittently or continuously impressed with possibly different potentials $U_c$ to simultaneously apply x- and y-components of field correction at the dielectric surface. However, it should be emphasized that the relatively high field strengths resulting from the small annular gap of the electrodes 8, 9 will in general render extrinsic surface fields and field inhomogeneities relatively insignificant, so split electrodes will not be required for most applications.

Figure 3:
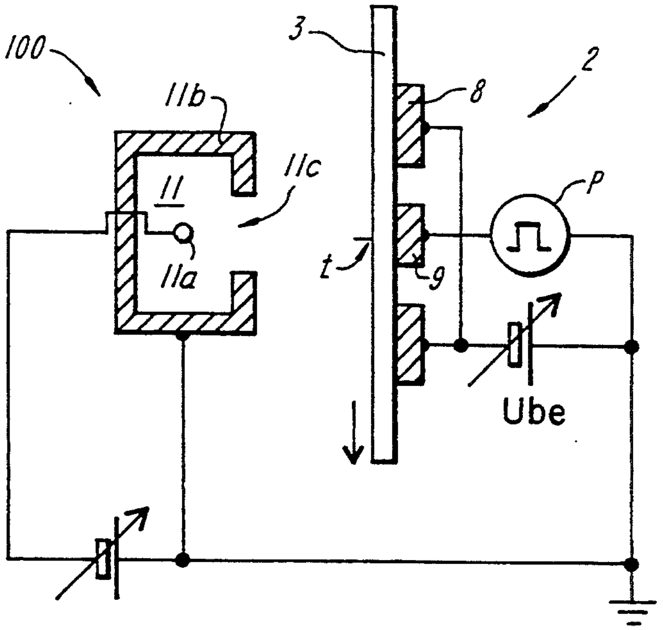
FIGS. 3 and 4 show two different embodiments employing a simple source of charged particles.
Figure 4:
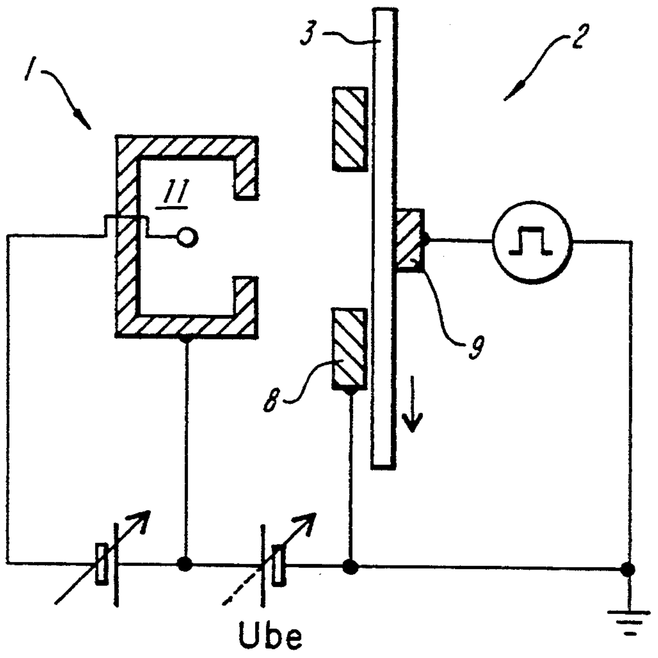

In discussing the electrostatic environment at each latent image dot, the charge deposition structure has been illustrated with a conventional imagewise-depositing cartridge 1 that itself is controlled by multiplexing its drive and finger lines, in a conventional way, to define a packet of charged particles and direct it at each selected target image point on the imaging member. FIGS. 3 and 4 illustrate other embodiments of the invention, wherein a regional or diffuse charge source, such as a corona wire, is used to provide the basic flux of single-polarity charge carriers. In this case, the potential on at least one of the sets of electrodes 8, 9 is intermittently switched to control the precise landing position and size of the deposited dots. As discussed further below, such switching of the electrode potential operation may also control the quantity of charge delivered at each dot, thus controlling both the size and the density of an image dot.

In the system 100 of FIG. 3, shown in a section taken along the direction of travel of member 3 and perpendicular to the member, an extended corona source 11 such as a corona rod is positioned opposite the imaging member 3. The rod 11 has a thin high voltage corona wire 11*a* surrounded by a conductive shield 11*b*, within which it forms a confined plasma, and also has a slot 11*c* through which charged particles may be extracted from the plasma. The shield and slot 11*b*, 11*c* function analogously to the screen electrodes of a print cartridge. At each dot position, a central electrode 9 is positioned in alignment with the source slot 11*c*, and is generally maintained at the potential of shield 11*b*, and energized intermittently with a drive pulse P of potential $U_{dp}$ for a brief period to attract charge carriers from the source 11 to the target point t. As in the other embodiments, a fixed potential difference $U_{be}$ is applied between the central and peripheral electrodes 9, 8, to maintain a centrally focusing field gradient above the target point t.

FIG. 4 shows another embodiment of the invention in a system employing a corona rod or other bulk charging source. In this embodiment, peripheral electrodes 8 are placed on the near side of member 3, while the targeting electrodes 9 are placed on the other side. By placing the biased electrodes 8 between the dielectric imaging member 3 and the corona device 100, the dielectric imaging member is more effectively screened against stray charge from the corona. On the other hand, by having electrode 9 offset far behind the aperture in electrode 8, a somewhat higher potential difference between electrodes 8, 9 may be required to effectively direct the unipolar charge carrier from the corona rod 11 to the target point.

It should be observed that in general the electrode 9 defines the center of the focusing equipotential lines about the landing site, and its physical dimensions (diameter) correspond to the region to which incoming charge carriers are directed. The invention therefore contemplates that electrodes 9 have a small size, generally under 0.2 mm and preferably about 0.1 mm.

Figure 11:
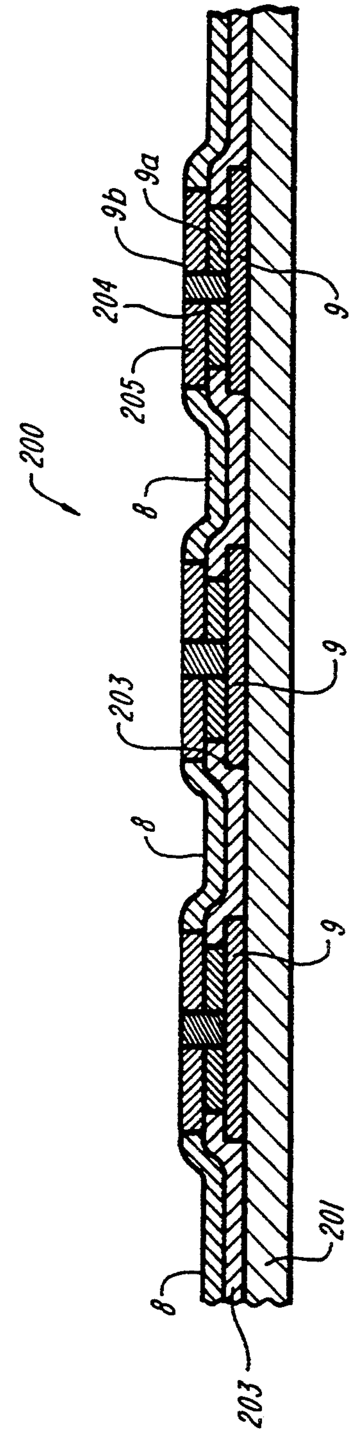
FIG. 11 illustrates a thin film microlithographic embodiment.

In a preferred form of construction, the provision of a large two dimensional array of small electrodes 9 is achieved by using thin film microlithographic techniques to form conductive pattern features. One such array 200 is illustrated in section in FIG. 11, and may be formed as follows. Control electrodes 9 are deposited or formed in a pattern with connecting leads on a dimensionally stable flat substrate 201, such as a fiberglass board, through a pattern mask, or using other conventional microlithographic method. A conformal insulating coating 203 is then laid down over the electrodes 9 and the surrounding areas, and openings 204 are etched therethrough to expose a central region of each electrode 9. Electrode projections **9*a* are then formed on each electrode 9, e.g., by electroplating, filling the openings 204. An annular resist 205 is then formed over the filled areas of each target electrode region, and a metallization layer 206 is electroplated over the surface, forming field electrodes 8, and extending the tip 9*a* with a metal crown 9*b* so it is flush with the surface. As will be readily understood, electrodes may be laid down as an array of individual or group electrodes, thus requiring several steps of resist coating exposure, pattern etching, metal deposition and resist removal, or may be laid down without masking as a continuous metallization layer (as for example, in the embodiment of FIGS. 5–7, below), in which the various openings are subsequently formed by a resist coating, patterning and etching procedure to expose and build up the targeting electrodes 9**. In that case, the metal removal step may be used to separate the continuous surface into access leads, split electrodes, and the like. Variations of the foregoing procedure are readily adapted to produce the illustrated electrode array structures.

Figure 5:
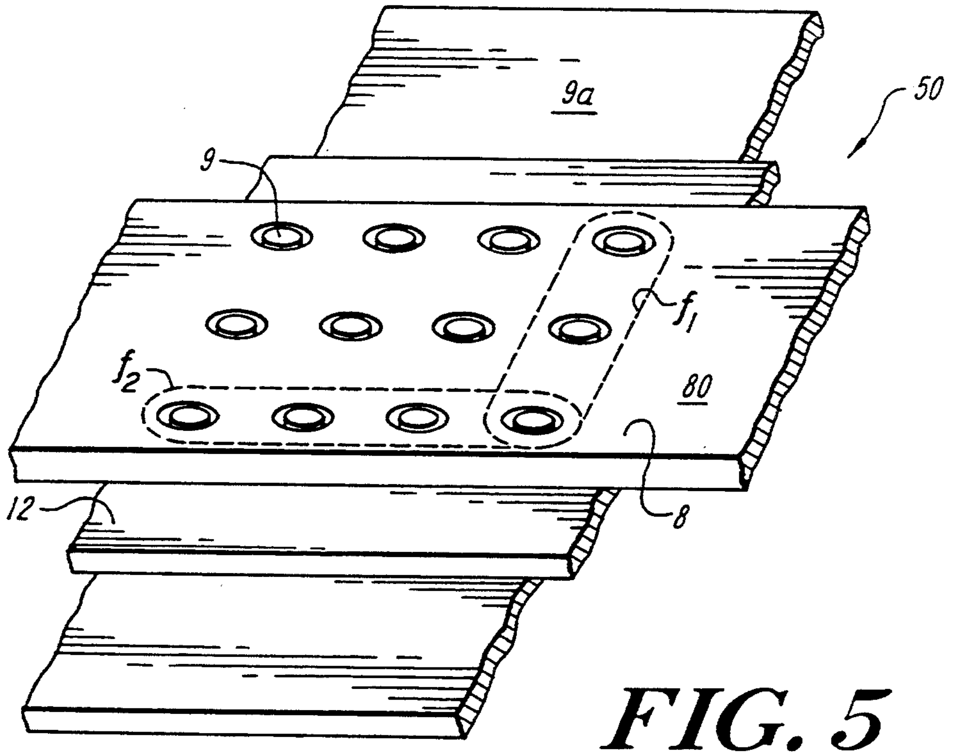
FIGS. 5, 6, and 7 show three different constructions for a high resolution landing array according to the invention which may be used with conventional charged particle sources.
Figure 6:
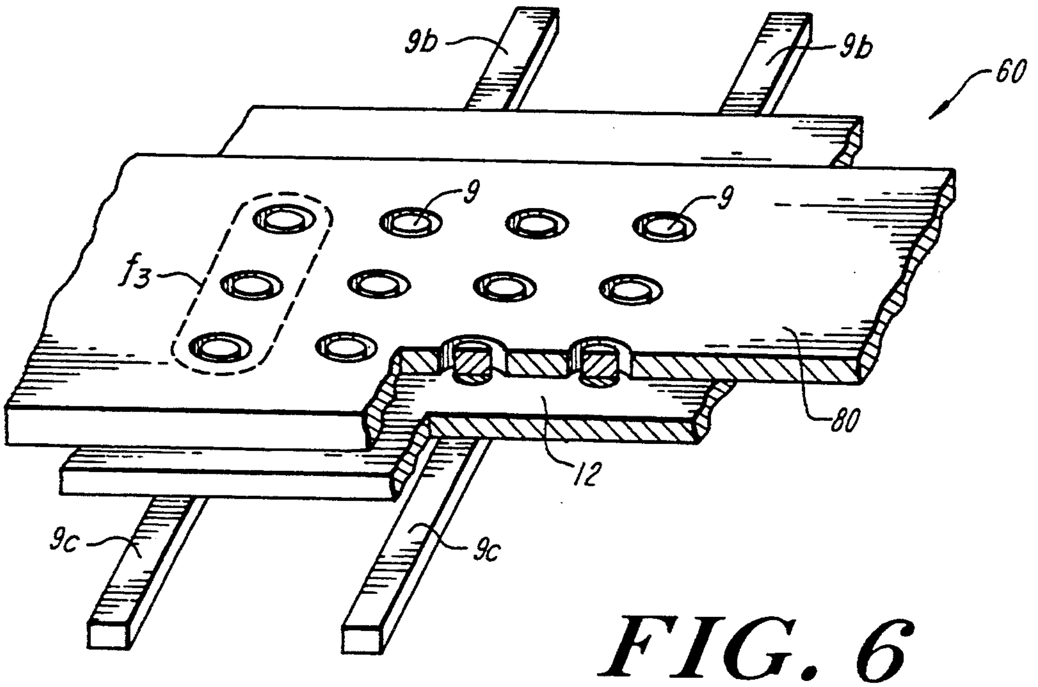
Figure 7:
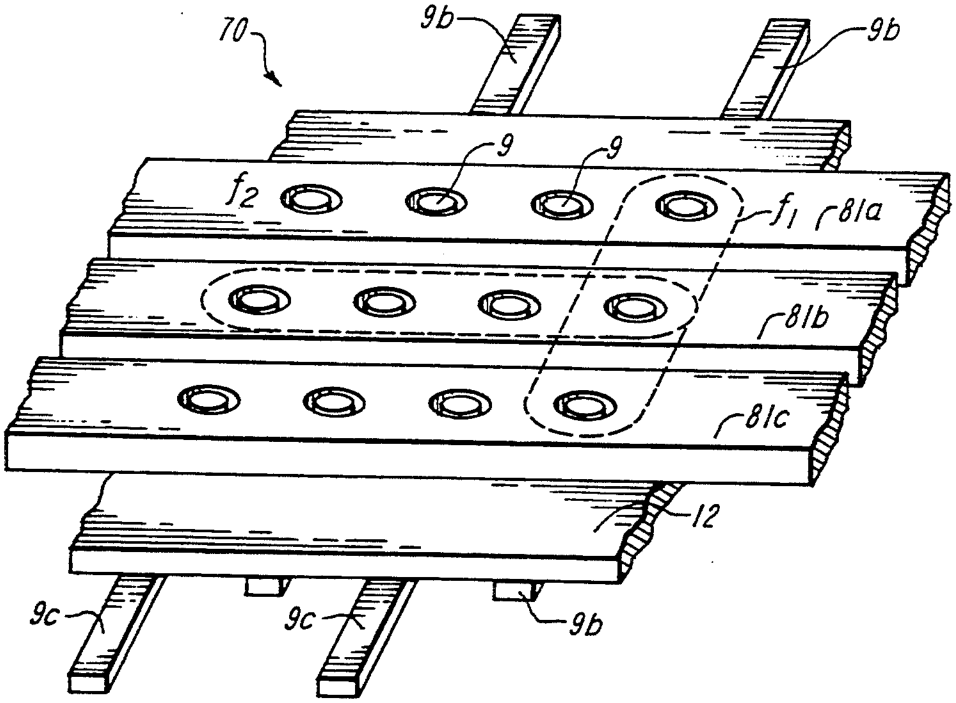

FIGS. 5–7 illustrate different aspects of construction of a blooming suppressor in accordance with the present invention, illustrating how ranks of many dot loci are defined and energized in synchronization. As shown in FIG. 5, an electrode structure 50 may be formed having rows, columns or other linear subgroups $f_1$ or $f_2$ of electrodes, which in use are aligned with the charging sites of each RF line or with each "finger" of a conventional charge deposition cartridge. In this embodiment a conductive sheet **9*a*, which may, for example, be the top surface of a copper clad glass board (not shown), is covered with an insulating layer 12 having through-openings corresponding to the intended dot positions, and individual conductive posts or through-electrodes 9 are deposited e.g., electroplated through the openings in layer 12 to contact the sheet 9*a*. This provides a structure of central electrodes 9 all of which are tied together at a common potential. Peripheral electrodes 8 are then constituted by a sheet or strip, which is formed by conventional lithographic or circuit microfabrication techniques. When the sheets 9*a*, 80 are energized and placed behind member 3 to provide the desired centering and focusing of charge onto precise areas above the landing electrodes 9, the array 50** operates as a passive device to locate and densify charge which has been generated by the print cartridge, concentrating charge at the target electrode positions. The target electrodes are aligned with holes of the print cartridge located on the other side of the imaging member.

FIG. 6 shows another embodiment 60 wherein control of charge dots may be effected through the electrode array itself. In this embodiment, the electrodes 9 are arranged in small ranks or groups $f_3$ in which all centering electrodes 9 of a group are connected to a single lead-in conductor, **9*b* or 9*c*, which, as before are formed on the surface of a glass board or other dimensionally stable substrate, not shown. Preferably, as shown, two lead in electrode sets are used, from the left and the right, to achieve a dense finger electrode packing, conductors 9*b* extending to one side, whereas conductors 9*c*** extend to the other side of the region, doubling the number of contacts which may be made to control the operation of sets of electrodes. As before, the peripheral electrodes are provided by a common perforated conductive layer, which may be coextensive with the entire array, or may be one of many multi-dot control strips that run parallel to the page line direction and collectively cover the array but are independently energized.

With the electrode array of FIG. 6, the two-channel multiplexing of RF drive lines synchronized with finger electrodes, as formerly used on electrographic print cartridges, may be replaced by one-channel multiplexing of the print cartridge (e.g., successive switching of the RF drive lines, leaving the finger electrodes always at their ON potentials), coordinated with one-channel multiplexing of the target electrodes (i.e., successive switching ON of target electrode groups **9*b* or 9*c*** parallel to the desired finger positions).

As a further step in this direction, the print cartridge may be always ON, or may be a bulk source, and full x- and y-multiplexing may be performed on the landing electrode array. In that case the set of electrodes 8 and the set of electrodes 9 are preferably each coupled together in respective columns and rows that may be actuated to cause charge deposition at their crossing points. This latter configuration is best illustrated in FIG. 7, wherein an array 70 is constituted by central electrodes 9 each lying at the crossing point of a first rank $f_1$ of dot electrodes extending in a first direction and connected to a left- or a right-side access conductor **9*c* or 9*b*, respectively, and a second rank $f_2$ defined by a set of apertured electrode positions formed in a single peripheral strip electrode 81*a*, 81*b*, or 81*c*. With this arrangement, coordinated application of the potentials applied simultaneously to one electrode of each set as the imaging member 3** moves past a charging source allows flexible imagewise control of dot size and charge density simply by switching the control signals on the landing array.

Combinations and variations of the above described geometries are also possible, using matrix layouts which have previously been worked out and developed for gating ions or toner particles in various printing or direct development applications of the prior art, in order to achieve dense arrays of control positions.

Figure 10:
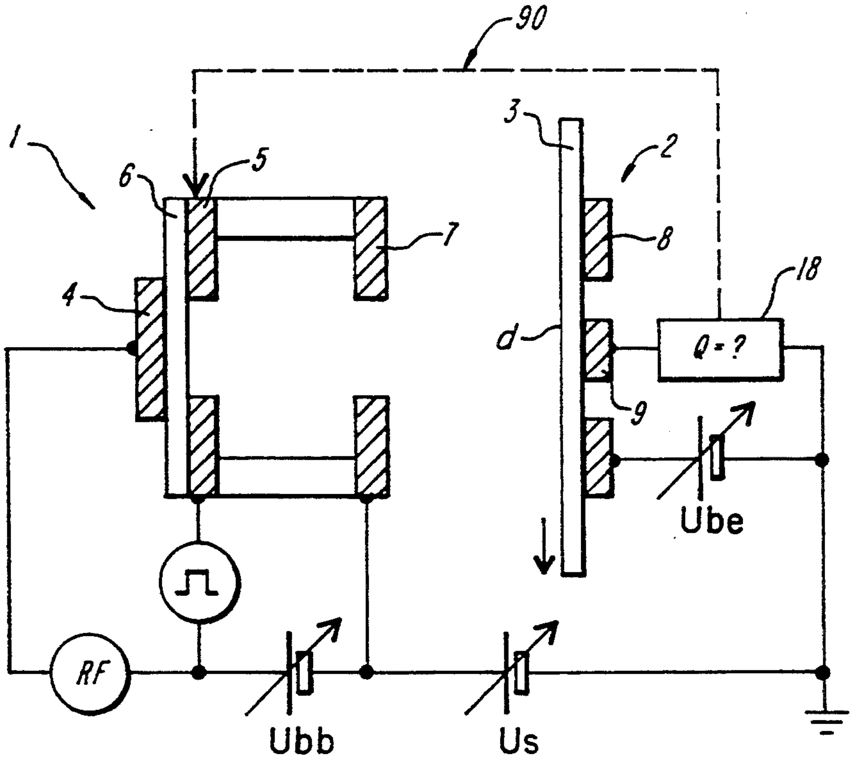
FIGS. 10, 10A and 10B illustrate further embodiments of the invention with self-quenching feedback.

FIG. 10 illustrates a further embodiment of the invention, applied to a system such as shown in FIGS. 2A or 2B, wherein the charge source actively generates a charging beam for each point, and further having a pointwise feedback control loop from the target region. In this embodiment, print cartridge 1 and landing electrode array 2 may be the same as illustrated in FIG. 2A, and all elements thereof are therefore designated by identical corresponding numerals. Additionally, however, a charge sensor 10 is connected to each of the center electrodes 9 to develop a signal representative of the amount of charge which has landed on the adjacent dielectric member 3 at the corresponding dot d. This signal is fed back in loop 90 to control the respective finger electrodes 5 which gate the beam of charged particles out of the print cartridge 1. It will be recalled that print cartridges of this type are generally operated by switching the level of bias voltage on the finger electrode, with respect to the potential of the outer or screen electrode 7. Thus, it is intended that when charge at electrode 9 has reached a desired level the feedback line 90 may operate a controller that affects either the timing or potential level of this switched bias change, in order to assure that the corresponding finger electrode is turned off.

Figure 10A:
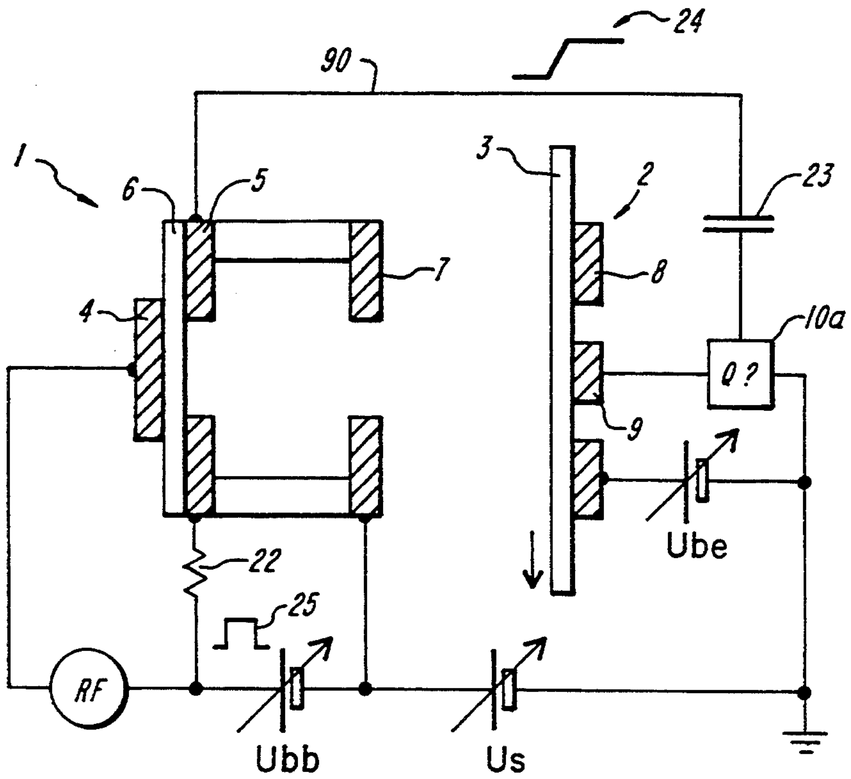

A particularly useful implementation of this aspect of the invention is shown in FIG. 10A. This embodiment differs from that of FIG. 10 in having the finger electrode 5 connected to the bias level control through a relatively high resistance 22. A passive self-quenching feedback loop is provided by passing a signal from electrode 9 via sensor 10*a* to a capacitor 23 which charges to produce a signal trace indicated at 24 on line 90. Charge sensor 10*a* may include a voltage amplifier, to introduce a gain factor such that the capacitor 23 charges to a specified voltage level, or an inverting amplifier to determine both the magnitude and polarity of trace 24, which are selected so that the signal on line 90, connected to finger electrode 5, overcomes the ON pulse 25 acting through resistor 22, and returns the finger electrode to a potential within its back-biased range. Thus, as charge builds up to a desired level at each dot d, charging of capacitor 23 automatically quenches the further delivery of charges by biasing the print cartridge to its OFF state.

Operation of this feedback control will be seen to carry out an entirely passive self-quenching operation, shutting off the cartridge as dot density approaches a preset limit. Numerous variations of this feedback control will occur to those skilled in the art. For example sensor circuit 10*a* may contain switching circuitry for gating one or more interrogation samples of charge developing over electrode 9 to charge a small capacitor 23, or may contain threshold detection circuit elements for generating a single output pulse when the charge dot potential attains a certain magnitude. Similarly, line 90 may connect to a multi-line controller that individually sets the finger bias, and may carry either a discrete time impulse signal, or a growing analog signal to convey the detected charge information. In that case the signal on line 90 provides an indirect control signal which may be further processed for varying the magnitude or timing of the print cartridge electrode control potentials.

Figure 10B:
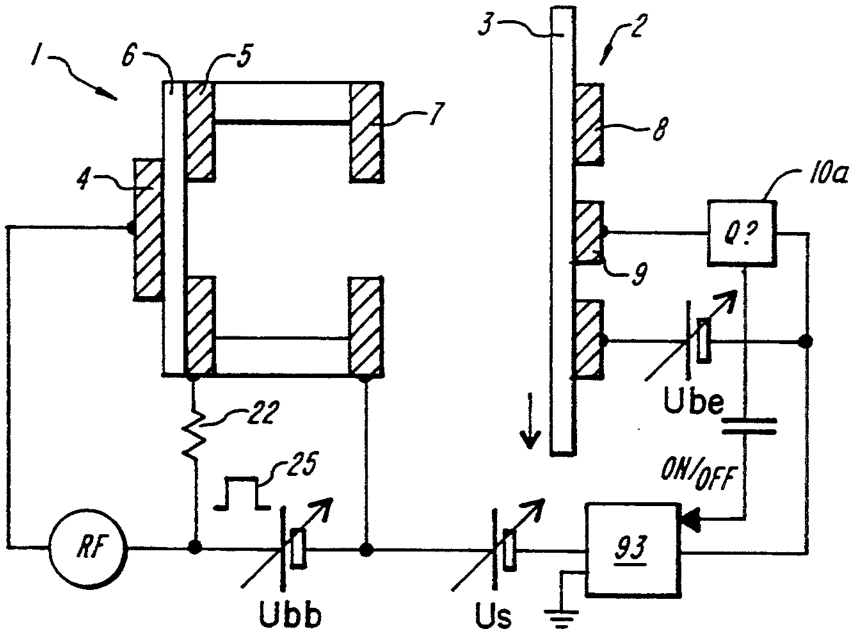

Further, as shown in FIG. 10B, rather than a feedback loop to the print cartridge or its controller, the detected charge at target electrode 9 may be sent to switching unit 93 to change the back electrode voltage so that charge is no longer accelerated across the gap to the member 3.

For the bulk charging constructions of FIGS. 3 and 4, an analogous self quenching circuit may be achieved by providing a delivered charge signal along line 90 to a conductive screen or grid (not shown) which is placed between the corona assembly 11 and the dielectric member 3. As in the case of pointwise imaging print cartridges, the sensor circuitry and capacitor 23 used in the feedback circuit have characteristics selected so that the potential developed on line 90, applied to the screen, prevents further charge from reaching the dielectric member at dot position d. In this case, the screen may be segmented into a number of electrically separated regions which are each biased by a hard wired feedback connection from the developing charge at the dot regions below. Alternatively, the sensed charge may be used to trigger separate voltage switching circuitry that lowers the screen voltage.

It will be seen from the foregoing that the invention provides a novel back electrode structure for high density high resolution charge imaging, and may be used with bulk or imagewise sources of charging particles, in implementations that include arrays of target and focusing electrodes which may in different embodiments be controlled individually or multiplexed in strip-shaped groups. The invention being thus disclosed, variations and modifications will occur to those skilled in the art, and all such variations and modifications are considered to be within the scope of the present invention, as defined by the claims to follow.

What is claimed is:

1. A system for depositing a pointwise latent charge image on an imaging member having a first side and a second side, said system comprising first means placed on said first side of the imaging member for providing a single polarity flow of charged particles over a region second means for defining an array of localized landing sites for said charged particles, each of said landing sites comprising a set of electrodes and a dielectric sheet spacing said electrodes in stable alignment each set including i) a target electrode in registry with said first means and located on the second side of said imaging member from said first means, and ii) a field electrode assembly surrounding the target electrode and providing an electric field to direct incoming charged particles toward said target electrode.

2. A system according to claim 1, wherein said electric field has a radial component about said target electrode.

3. A system according to claim 2, wherein said radial component is of a magnitude selected to overcome surface field divergence due to accumulation of charge on the imaging member.

4. A system for depositing a pointwise latent charge image on an imaging member having a first side and a second side, said system comprising first means placed on said first side of the imaging member for providing a single polarity flow of charged particles over a region second means for defining an array of localized landing sites for said charged particles, each of said landing sites comprising i) a target electrode in registry with said first means and located on the second side of said imaging member, and ii) a field electrode assembly associated with said target electrode and providing an electric field to direct incoming charged particles toward said target electrode, and feedback means responsive to a charge of the charged particles at the target electrode for controlling flow of charged particles from the first means.

5. A system according to claim 4, wherein the feedback means controls a potential applied to said second means for stopping flow.

6. A system for depositing a pointwise latent charge image on an imaging member having a first side and a second side, said system comprising first means placed on said first side of the imaging member for providing a single polarity flow of charged particles over a region second means for defining an array of localized landing sites for said charged particles, each of said landing sites comprising i) a target electrode in registry with said first means and located on the second side of said imaging member, and ii) a field electrode assembly associated with said target electrode and for providing an electric field to direct incoming charged particles toward said target electrode, wherein said field electrode assembly includes a split electrode.

7. A system according to claim 1, wherein said first means includes a matrix array of charged particle emitters and said second means includes a target electrode in registry with each emitter of said array.

8. A system according to claim 1, wherein said first means includes a bulk source of charged particles, and said second means includes an array of target electrodes each surrounded by a field electrode, the second means further including means for switching potential of at least one of said target or field electrodes for effecting imagewise charge deposition on said imaging member.

9. A system according to claim 4, wherein said feedback means is a self-quenching loop that diminishes an acceleration field between said first means and the target electrode.

10. A system according to claim 4, wherein said feedback means includes discrete switching means for changing a state of the first means to stop flow of charged particles from said first means.

11. A system according to claim 6, further comprising means, for applying different potentials to segments of the split electrode.

12. An electrographic printing system for depositing an electric latent image on a dielectric member, such system comprising a first set of electrodes defining a plurality of charge generation sites which generate charged particles at a first matrix array of positions in a first region a second set of electrodes defining a plurality of charge target sites at a second matrix array of positions in a second region, each of said target sites being defined by a respective one of a plurality of target electrodes in said second set of electrodes, all the target electrodes being supported by a sheet member at positions of said second matrix array each of said positions of said second matrix array being aligned with each of said positions of said first matrix array with the dielectric member passing therebetween such that said charged particles drawn from said first matrix array to said second matrix array are focused to corresponding points above said charge target sites on said dielectric member and deposited as non-spreading charge dots.

13. An electrographic printing system according to claim 12, further comprising means for actuating selected ones of electrodes of said first set and electrodes of said second set for depositing a selected set of non-spreading charge dots to form a latent image.

14. An electrographic printing system according to claim 12 or 13, further comprising cut-off means, responsive to charge deposited at said charge dots, for stopping charge deposition.

15. An electrographic printing system comprising a first set of electrodes for generating single-polarity charged particles in a region extending across a first side of an imaging member a second set of electrodes defining a plurality of electric field focusing dimples in said region, each of said dimples focusing charged particles from said first set onto one of a plurality of points of said imaging member each of said points being defined by one of said electrodes of said second set located on a second side of said imaging member, electrodes of said second set being supported by a dielectric sheet to maintain said electrodes of said second set in stable alignment.

16. Apparatus for forming a latent image on a dielectric member, such apparatus comprising first means for producing a generally confined source of unipolar charged particles adjacent to a first side of the dielectric member a matrix array of acceleration electrodes positioned on a second side of the dielectric member for accelerating charged particles to dot regions on the dielectric member, each of said dot regions corresponding in size and position to one of said acceleration electrodes of said matrix array, and field electrodes surrounding each of said acceleration electrodes and forming a focusing field dimple thereabout so that charge carriers accelerated toward said dielectric member preferentially land at said dot regions, wherein said field electrodes and acceleration electrodes are formed in a sheet electrode assembly including a dielectric spacer layer that maintains the electrodes spaced apart in a stable array.

* * * * *

UNITED STATES PATENT AND TRADEMARK OFFICE

CERTIFICATE OF CORRECTION

PATENT NO. : 5,450,103

DATED : September 12, 1995

INVENTOR(S) : Igor Kubelik

It is certified that error appears in the above-indentified patent and that said Letters Patent is hereby corrected as shown below:

At column 1, line 22, please change "Catfish" to --Carrish--; and

At column 11, line 60, after "means" please delete --,--.

Signed and Sealed this

Seventh Day of October, 1997

Attest:

Bruce Lehman

BRUCE LEHMAN

*Attesting Officer*

*Commissioner of Patents and Trademarks*